United States Patent [19]

West, Jr.

[11] Patent Number: 5,436,822
[45] Date of Patent: Jul. 25, 1995

[54] POLARITY REVERSING DC POWER SUPPLY FOR REMOTELY LOCATED EQUIPMENT

[75] Inventor: Lamar E. West, Jr., Maysville, Ga.

[73] Assignee: Scientific-Atlanta, Inc., Atlanta, Ga.

[21] Appl. No.: 923,359

[22] Filed: Jul. 31, 1992

[51] Int. Cl.6 .................................. H02M 7/02
[52] U.S. Cl. ...................................... 363/63
[58] Field of Search .............. 363/15, 16, 34, 37, 363/63; 348/6, 8, 10, 11

[56] References Cited

U.S. PATENT DOCUMENTS

| | | | |
|---|---|---|---|
| 2,821,639 | 1/1958 | Bright et al. | 307/885 |
| 3,921,053 | 11/1975 | Hekimian | 321/2 |
| 3,987,240 | 10/1976 | Schultz | 358/86 |
| 4,002,956 | 1/1977 | Minor et al. | 317/154 |
| 4,313,132 | 1/1982 | Doles et al. | 358/86 |
| 4,443,815 | 4/1984 | Hempell | 358/86 |
| 4,577,224 | 3/1986 | Ost | 358/114 |
| 4,740,878 | 4/1988 | Carter et al. | 363/63 |
| 4,837,820 | 6/1989 | Bellavia, Jr. | 358/86 |
| 4,839,788 | 6/1989 | Tullsen | 363/63 |
| 4,912,760 | 3/1990 | West, Jr. et al. | 380/7 |
| 4,937,865 | 6/1990 | Barany | 380/7 |
| 4,963,966 | 10/1990 | Harney et al. | 358/349 |
| 5,086,512 | 2/1992 | Bartz | 455/186 |
| 5,233,652 | 8/1993 | Huang et al. | 358/349 |
| 5,317,254 | 5/1994 | Olson | 323/316 |

OTHER PUBLICATIONS

Campbell, W. Sherwood, "Powering the Off-Premises Signal Control System", 1985 NCTA Technical Papers, pp. 72–73.

*Primary Examiner*—Steven L. Stephan
*Assistant Examiner*—Matthew V. Nguyen
*Attorney, Agent, or Firm*—Jones & Askew

[57] ABSTRACT

A polarity reversing DC power inserter circuit for remotely located equipment such as interdiction apparatus or other signal control apparatus used in a cable or community antenna television (CATV) signal distribution system. A power transformer circuit receives a 117 volts AC power source at a subscriber's premise and converts it to a lower voltage positive and negative DC. A polarity reversing circuit comprising switching transistors and a 50% duty cycle multivibrator switches between the lower voltage DC at a frequency less than 10 Hz so as to avoid shock hazards associated with normal alternating current, while alternating sufficiently often to avoid electrolysis and corrosion problems associated with use of direct current (DC) powering. The reversing polarity DC power is then inserted into a cable drop to be provided uplink to the signal control apparatus. At the signal control apparatus, the polarity reversing DC is converted into DC by a power utilization circuit, and then utilized to power the signal control apparatus.

29 Claims, 3 Drawing Sheets

POLARITY REVERSING DC POWER SUPPLY FOR REMOTELY LOCATED EQUIPMENT

TECHNICAL FIELD

The present invention relates generally to power supply circuits, and more particularly relates to a polarity reversing DC power supply circuit for remotely located equipment, particularly usefuly for powering cable television signal control apparatus located remotely from and connected to a subscriber facility and primary power supply by a conductor such as a drop cable.

BACKGROUND

Recent years have seen growing cable televsion industry interest in various types of off-premises signal control systems, such as interdiction systems for denying programming to cable or community antenna television (CATV) subscribers who have not purchased it. A number of concerns with such off-premises equipment revolve around the need for providing electrical power to the circuit. One concern is the cost burden to the cable system operator if the off-premises system is powered from the feeder or distribution cable, or the cost burden to the subscriber if powered from the subscriber's facility. Another concern is the compatibility of an off-premises system into an existing plant, since a retrofit of new equipment such as an interdiction system must be virtually transparent to subscribers. A third and primary concern is safety if power is being supplied from the subscriber's facility so as to ensure that no shock hazard will be created. The latter concern is especially important in cable television distribution systems for home viewing, since cable subscribers often connect and disconnect their own cable equipment such as VCR's, cable converters, and the like.

Because of the increasing popularity and acceptance by cable system operators of signal control systems such as interdiction systems, there is a particular need for power circuits for powering off-premises cable television channel interdiction systems such as those shown in U.S. Pat. No. 4,912,760 to West, Jr. et al., and U.S. Pat. No. 5,109,286 to West, Jr. et al., both owned by the assignee of the present application. In these systems, an off-premises cable television interdiction apparatus comprises a microprocessor actuation and control means for actuating and controlling a plurality of frequency agile voltage controlled oscillators. The voltage controlled oscillators selectively jam only unauthorized premium programming transmitted "in the clear" from a headend system to a particular subscriber. The interdiction system prevents the reception of jammed premium programming by the unauthorized subscriber. During the normal mode of operation, a frequency hopping circuit operates to receive and store voltage control words for operating the oscillators consistent with a headend selected jamming factor for a particular channel to be jammed and addressably transmitted and stored premium programming authorization data.

Off-premises interdiction and other signal control devices contain electrical devices for receipt, processing, and storage of control information signals from the headend as well as for re-transmission or jamming of the programming signal, and require electrical power for operation. The devices present to be powered typically include at least one microprocessor, associated memory, voltage controlled oscillators, broadband amplifiers, video amplifiers, and other electrical components. These circuits can draw as much as about 25 watts of power for each subscriber. Although 25 watts per subscriber is a relatively nominal power drain if taken alone, or if provided by the individual subscribers, the aggregate power requirements for a large cable system would nevertheless constitute a significant cost factor to the operator if the entire system were required to provide power for the interdiction systems for all subscribers.

Some off-premises signal control systems have power consumptions per subscriber of about 4 watts for interdiction systems and up to about 35 watts for frequency (channel) conversion systems. For a system designed for about eighty subscribers per mile, the signal control power consumption would be 320 watts per mile for an interdiction system, and 2,800 watts per mile for a frequency conversion system. It will thus be understood that the power requirements for the cable operator can be substantial in a large system. Additionally, it is known that approximately 15-20 percent of power supplied is actually lost as heat in trunk and feeder cables. For example, in carrying 10 amps through one mile of $\frac{3}{4}$ inch copper clad aluminum center conductor GID cable, 380 watts are dissipated. For smaller cables, such as $\frac{1}{2}$ inch cable, up to 866 watts is lost.

When off-premises signal control powering needs are considered, and taking into account factors for cable loss and power supply efficiencies, usage of interdiction systems and conversion systems adds to a power cost for signal security alone of in excess of $100,000 per year for a 100 mile system, and such calculations do not take into account the capital and labor cost for installation. Accordingly, there is substantial interest in providing power for off-premises signal control systems by subscriber located power supplies.

It is believed that, if power supplies for interdiction and similar signal control systems can be made small and unobtrusive, and if the power consumption can be held sufficiently small to be insignificant compared to the other power usage of the subscriber, there will be fairly good acceptance of subscriber-located power supplies. Typical cable subscriber drops are RG-59 size foam dielectric cable with an aluminum foil sheath and a copper clad steel center conductor of 73 ohms per 1,000 feet loop resistance. Provision of a 3 watt interdiction system would cause a 0.95 volt drop in the drop cable, with 3.12 watts being supplied by the subscriber. If an 80% efficiency of the voltage conversion in the subscriber's home is assumed, the interdiction system would draw 3.9 watts from 120 volts alternating current (VAC), at a nominal cost of about $2.75 per year at current power rates in many parts of the United States. This amount of power consumption is considered nominal and should be accepted by most subscribers by explaining that the subscriber's fees would have to be increased if the subscriber were not supplying the power.

If power is to be supplied at the subscriber's facility, safety concerns become paramount. It is generally considered that 24 volts drawn from an AC to DC power converter is considered safe in an indoor environment. However, since it is possible that a small child would pick up a broken drop cable while standing in a puddle of water, additional safety requirements are present. It is known that the most hazardous frequency for cardiac fibrillation and the primary cause of death from low voltage electrical shock is close to about 60 Hz, the common AC power supply source in the United States. It is therefore important that the power supply avoid frequencies at or near 60 Hz.

It is also known that if the frequency could be reduced or eliminated to DC, or to a low frequency alternating current of about a few tenths of a Hertz to avoid galvanic corrosion problems, or the AC frequency could be increased to approximately 10 kHz, the safety factor is substantial greater. The provision of electrical power by pure DC is not considered acceptable because of galvanic corrosion problems. Moreover, the provision of power at frequencies approaching or exceeding 10 kHz are undesirable due to the additional expense and complexity of the circuitry and the need to block the 10 kHz and harmonics from the information signal.

One prior art approach is the provision of off-premises power supply circuitry that interrupts the voltage leaving an in-premises power supply if the drop current is interrupted. In this particular system, when drop integrity is restored, the system automatically restarts if some other subscriber or subscribers are still supplying power to the off-premises device. If that subscriber was the only one supplying power, he may attempt to restart by pressing an "on" button. Power will come on for a predetermined time period of several hundred milliseconds, and if no data communications are established from the off-premises device within that time, the system assumes drop integrity has still not been restored and voltage is again interrupted. This timing is considered sufficiently shorter than the time required for a shock hazard to be generated at the voltages involved.

It is known that powering may be accomplished for off-premises equipment by either AC or DC. AC is generally favored by the CATV operator's community due to fewer problems with corrosion as a result of electrolysis. However, use of AC presents difficulties of successfully powering the equipment while meeting applicable regulatory and safety requirements. Use of DC would overcome the regulatory and safety difficulties, but presents a corrosion difficulty.

In a typical CATV subscriber connection, electrical power must pass through at least four electromechanical connections—one at the power source, two at a ground block just outside the subscriber's premises, and one at the off-premises equipment. Each of these connections is typically made with the F-connector commonly used in the CATV industry, which is known to be susceptible to corrosion in the presence of direct current. The corrosion effect is explained by Faraday's principles of electrolysis, that the quantity of an element undergoing chemical reaction at an electrode is proportional to the quantity of electric charge passing, proportional to the atomic mass of the element, and inversely proportional to its valence. It is known to those skilled in the art that electrodes are formed at each electromechanical connection in which air can be in proximity to the metal. Since air carries moisture, the classic conditions for electrolysis are met—an electrolyte (moisture in the air combined with surface impurities), dissimilar metals in the mechanical mating of two surfaces at the connector, and current (for the instant case of powering through the coaxial cable). Under these conditions, the elements on each of the mating connector parts will undergo a chemical reaction. This chemical reaction will ultimately result in the removal of material from one contact in such a way that, after sufficient time has passed, the electrical contact between the two connectors fails. The result is the undesirable and annoying interruption of cable television service to the subscriber.

Accordingly, there is a need for a power supply circuit for remotely located off-premises signal control systems which provides the safety advantages of DC, but avoids the electrolysis problems of DC.

SUMMARY OF THE INVENTION

Briefly described, the present invention is a polarity reversing DC power supply system for powering a signal control apparatus located remotely from a primary AC power source and connected to the signal control apparatus through a conductor having a finite resistance, such as a cable TV drop line. Means are provided for connecting to a primary AC source of power, such as 117 VAC. Means are provided for stepping down the voltage of the primary AC source of power to a predetermined DC voltage at positive and negative polarities. Means are provided for periodically reversing the polarity of the predetermined DC voltage at a frequency lower than the frequency of the primary source of power. Finally, means are provided for inserting the polarity reversed DC power into the conductor.

More particularly described, the polarity reversing means comprises a step-down transformer for connecting to a 117 VAC power source and for providing AC power at a reduced voltage. A full wave rectifier converts the reduced voltage AC power into a positive DC voltage and a negative DC voltage. A first switching transistor connects the positive DC voltage to a power buss, and an alternately actuated second switching transistor connects the negative DC voltage to the power buss. A constant duty cycle oscillator alternately switches on the first transistor and the second transistor at a predetermined frequency less than 10 Hz, to provide a low frequency polarity reversing DC power. Preferably the frequency of polarity reversal of the reversing means is less than 10 Hertz, to avoid classification of the reversing polarity DC as "AC" and to avoid shock hazards associated with AC power. An RF choke couples the polarity reversing DC power to the drop cable.

In accordance with the preferred embodiment of the invention, the system provides a source of power for a signal control apparatus in a cable television signal distribution system, wherein the conductor comprises a drop cable, wherein the primary AC source of power is located in a subscriber's facility, and wherein the signal control apparatus is an interdiction system.

According to another aspect of the invention, the primary power source connecting means and the stepping down means comprises a AC power pack for connection to 117 VAC and mounted in a first module, and the polarity reversing means and the inserting means are mounted in a second module separate from the first module.

The present invention finds particular utility in a cable television system comprising a distribution cable, a subscriber facility, a signal control apparatus located remotely from the subscriber facility and connected to the distribution cable, and a drop cable extending between the signal control apparatus and the subscriber facility. Accordingly, a system constructed in accordance with the present invention will include a polarity reversing DC power utilization circuit located proximate to the signal control apparatus, for converting the polarity reversing DC to a format suitable for powering the signal control apparatus. The preferred power utilization circuit includes a means for connecting to the drop cable, a means for connecting signals from the signal control apparatus to the drop cable, a means for converting the low frequency polarity reversing DC power to single polarity DC power, and a means for connecting the single polarity DC power to power consuming devices in the signal control apparatus. It is expected that the means for connecting the single polarity DC power to power consuming devices will typically comprise a switching power supply.

Accordingly, it is an object of the present invention to provide an improved power supply circuit for remotely located off-premises signal control equipment in a CATV system.

It is another object of the present invention to provide an improved power supply circuity for off-premises signal control circuits that possesses the safety advantages of DC yet does not suffer from the electrolysis disadvantages.

It is another object of the present invention to provide powering source for off-premises interdiction systems which have the advantages of DC powering without the disadvantage of electrolytic corrosion.

It is another object of the present invention to provide a power insertion circuit for obtaining power from a subscriber's facility in a safe manner, providing same via the cable drop to an off-premises electrical device, and converting the power into a form usable by the off-premises electrical device.

These and other objects, features, and advantages of the present invention may be more clearly understood and appreciated from a review of the following detailed description of the preferred embodiments and by reference to the appended drawing and claims.

DETAILED DESCRIPTION OF THE PREFERRED EMBODIMENT

Figure 1:
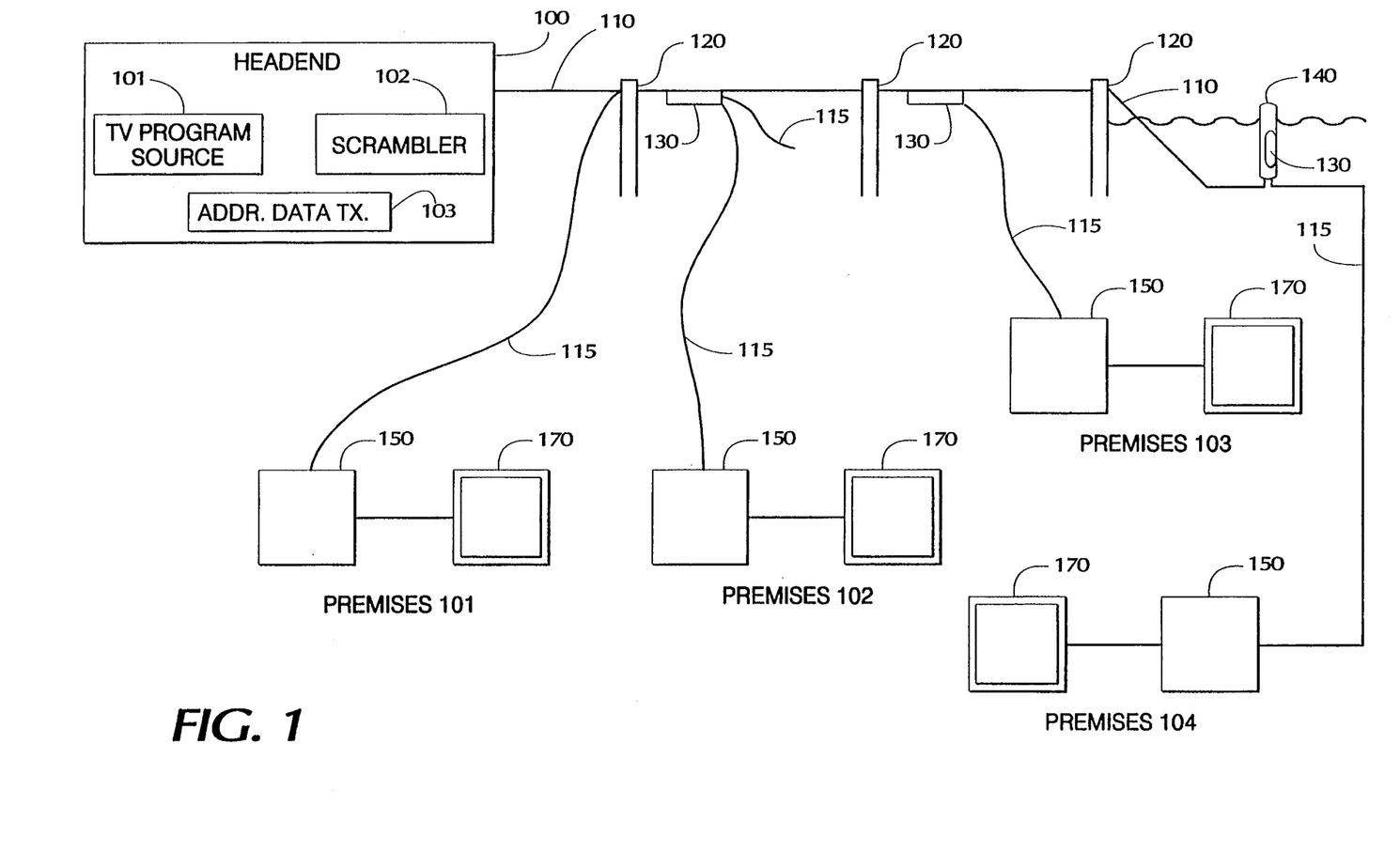
FIG. 1 is an overall system block diagram showing off-premise signal control apparatus used in a cable television system including interdiction and frequency conversion equipment.

Referring now to the drawings, in which like numerals indicate like elements throughout the several drawing figures, FIG. 1 is a general block diagram of a cable or community antenna television (CATV) system in which the present invention finds particular utility. By cable system is intended all systems involving the transmission of television or other information signals over a transmission medium (fiber optic cable or coaxial cable) toward remote locations. For example, a cable television system may comprise a community antenna television (CATV) distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, signal subscribers having plural television receivers or private locations in a private cable distribution network. Consequently, the term "subscriber", when used in this application and the claims, refers to either a private subscriber or a commercial user of the cable television system.

Headend 100 is the connecting point to a serving or distribution cable or trunk 110 for distributing television channels to a drop 115 and finally to subscriber locations. For reference purposes, an Electronic Industries Association (E.I.A.) standard cable television frequency allocation scheme is employed; however, by means of the following disclosure of the present invention, one may apply the principles to other types of information distribution systems involving the provision of information signals to subscribers via a transmission medium wherein a signal control system associated with the subscriber is remotely located and generally off-premise of the subscriber's facility.

Headend 100 comprises a source of television programming 101 or other information source. Television program source 101 may be a satellite television receiver output, a program produced by a television studio, program material received over a microwave or broadcast television link, a cable television link output, or any other source of television programming or other information provided to subscribers. The program or information source material need not be limited to conventional television but may comprise teletext, video text, program audio, utility data, or other forms of communication of information to be delivered to a remote location over the serving cable or trunk line 110 and consequently drop line 115.

Conventionally, trunk line 110 and drop line 115 are constructed of coaxial cable. For higher performance, any one of these lines could be a fiber optic cable. Preferably, due to the cost of the installation and the need for a high quality initial transmission from headend 100, trunk line 110 is typically the only line constructed of fiber optic cable.

Program material provided by source 101 may be premium or otherwise restricted or desirably secured from receipt at unauthorized receiver locations. To this end, each channel or program to be secured may be scrambled by a scrambler 102 provided at headend 100. By use of the term "premium channel" or "premium programming" is intended a channel or program which is desired to be secured from unauthorized receipt either because of its premium or restricted status.

Normally, all premium programming in known cable television systems is scrambled, as will be known to those skilled in the art. However, in accordance with known interdiction system technology such as described in the above-referenced U.S. Pat. Nos. 4,912,760 and 5,109,286, premium programming is transmitted "in the clear", and interdiction is applied at off-premises interdiction or other off-premises signal control apparatus 130 to jam reception of unauthorized premium programming. The equipment or apparatus 130 for providing off-premises interdiction or other signal control functions is generally housed in the apparatus 130, and is powered by circuitry constructed in accordance with the present invention.

Consequently, during a transition period in which headend 100 provides scrambled television programming as well as premium programming in the clear, a scrambler 102 will be provided so long as converters/decoders 150 are provided to subscribers for unscrambling scrambled program transmissions. Thus, for the subscriber premises 181, there is no separate signal control apparatus 130, inasmuch as the converters/decoders 150 are operative to receive the scrambled signals and unscramble same. In certain instances, for example in premises 182, 183, 184, converters/decoders 150 may be entirely replaced by interdiction apparatus 130. Nonetheless, it will be understood that descrambling or decoding equipment may be provided at off-premises housing 130. It will therefore be understood that converters/decoders, where provided remotely from the subscriber's facilities, are considered signal control apparatus that can be powered by the present invention.

Also, at the headend, there is normally an addressable data transmitter 103 for transmitting global commands and data downstream to all subscribers or forward addressed communications for reception by a unique subscriber. Such forward data transmissions may be conducted over a separate data carrier from the cable television spectrum, for example at 108.2 MHz. It may also be transmitted over an unused default channel in the television spectrum. Global commands generally take the form of operation code and data, while addressed communications further comprise the unique address of a particular subscriber. Commands to authorize service to a particular subscriber may be transmitted in-band or on a separate data carrier and typically involve transmitting a unique address of a particular subscriber unit, a command, and data. The decoder 150 receives the command, decodes it, and determines if the command is to be acted on, and if so to perform the desired action such as programming a subscriber with a pay-per-view credits or generally authorizing services.

Consequently, headend 100, cable television distribution cable or trunk line 110, subscriber drops 115, signal control apparatus 130, converter/decoders 150, and television receivers 170 at typical subscriber premises 181, 182, 183, 184 comprise a typical known cable television system. In accordance with a cable television system provided with interdiction or other off-premises signal control apparatus 130, a housing is mounted on a pole 120, or provided in a pedestal 140. Although not shown, the housing 130 may also be mounted indoors in an equipment closet of a multiple dwelling unit. Inside the housing is common control circuitry for tapping into the broadband television and data transmission spectrum. Referring to the first pole 120 from the left of FIG. 1, there is shown two drops 115 to subscribers at premises 181, 182. In systems constructed in accordance with the U.S. Pat. Nos. 4,912,760 and 5,109,286, four or more subscribers and up to four or more drops 115 may be served by a single interdiction apparatus 130.

Besides the common control circuitry, four or more plugged in subscriber modules may be provided for one off-premises housing. Also, additional services requiring two-way data transmissions such as subscriber polling, home shopping, burglar alarm, energy management, and pay-per-view may be provided by an apparatus 130 and powered in accordance with the present invention.

Preferably, all interdiction apparatus 130 are removed from the subscriber premises 182-184, to form off-premises equipment. However, for the provision of certain services, some on-premises equipment may be unavoidable. Furthermore, some return path equipment from the pioneer days of two-way cable systems may exist.

Since it is an object of the present invention that power for the off-premises apparatus 130 not be provided over the cable from the headend 100, power is preferably supplied via the subscriber drop 115. Consequently, subscriber equipment 150 will comprise a source of power for the off-premises interdiction apparatus 130.

Preferably, all off-premises service providing apparatus 130 may be secured in a tamper-resistant housing or otherwise secured such as in a locked equipment closet of an apartment complex. If located in a place exposed to the elements, the housing should be water-tight. Also, the housing should be designed to preclude radio frequency leakage.

Figure 2:
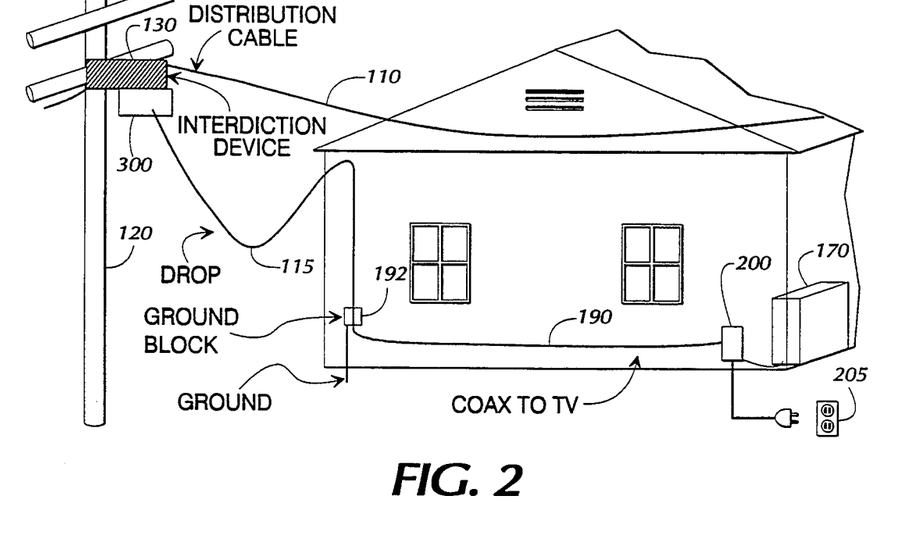
FIG. 2 illustrates a typical subscriber powering arrangement with an off-premise interdiction device being powered via a drop cable and coax cable to a power inserter circuit constructed in accordance with the preferred embodiment of the present invention.

Turning next to FIG. 2, in a typical application, the distribution cable 110 is supported between telephone poles 120 or similar distribution plant and a signal control system off-premises such as an interdiction device 130 is connected thereto. The drop cable 115 extends from the interdiction device 130 to the subscriber's facility such as a private home, where it is connected to a ground block 192. At the ground block, the sheath of the drop cable 115 is grounded and a connection made to a secondary internal coaxial cable 190. In accordance with the present invention, a power inserter circuit 200 is provided to provide power for the interdiction device 130, via the coax 190 up the drop cable 115. The television signal provided over the coax 190 must pass through the power inserter circuit 200 so that it can be connected to a channel converter, cable-ready VCR or television receiver 170. The coaxial drop cable 115 is normally an RG-59 or RG-6 type. Depending upon the configuration, this cable must provide 3.75 to 12 watts of power to the load on the pole. A typical 125 foot drop of RG-59 cable has a loop resistance of about 8 ohms.

It will be understood that although FIG. 2 illustrates a signal control device comprising an interdiction apparatus 130, other types of signal control devices such as frequency converters, energy management devices, pay-per-view devices, burglar alarm control units, and the like are also contemplated as signal control devices. For applications involving interdiction systems, it will be understood that television signals from the distribution plant are sent along the distribution cable 110 in the clear, that is, not scrambled. Those signals not purchased by the subscriber are jammed in the interdiction device 130, before being supplied to the subscriber via the drop cable 115. The drop cable is thus routed through the ground block 192 which is used to connect the cable shield to earth ground for safety, and on into the subscriber's facility. In the present case of home powering of the interdiction device 130, the coaxial drop cable 115 enters the home and is routed via the internal coaxial cable 190 to the power inserter 200, whose purpose is to insert power into the internal coax 190 and then via the drop cable 115 to the interdiction device 130.

Power for the power inserter circuit 200 is drawn from a 117 volts AC (VAC) wall outlet 205 within the subscriber's premises and is transformed in accordance with the present invention from the nominal 117 VAC to a more suitable power format, as described herein.

Figure 4:
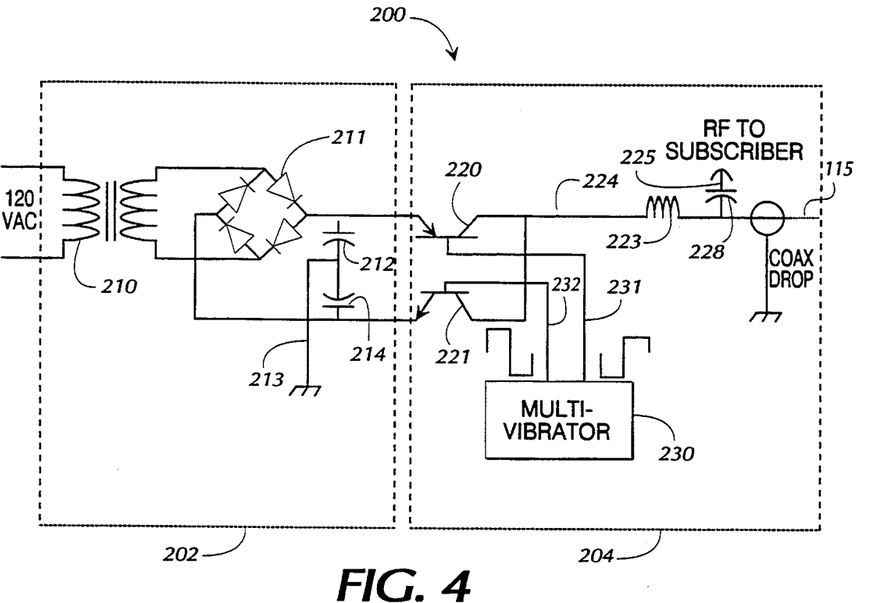
FIG. 4 illustrates a power inserter circuit constructed in accordance with the preferred embodiment of the present invention.

It should be understood at this juncture that variations are possible and are within the scope of the present invention and claims. For example, the power inserter circuit 200 may be replaced with a power supply whose output is routed to an external inserter (not illustrated), which may for example but not by way of limitation be located at or near the ground block 192 or in line with the coaxial cable 190 to the TV, either inside or outside the dwelling. One particularly advantageous configuration, as described in connection with FIG. 4, is for the power inserter circuit 200 to be split into a power pack portion 202 comprising a transformer and a format converter, which is then connected by wires to an external polarity reversing power inserter portion 204 that is located conveniently. This particular configuration allows the power pack to be located out of sight, and only a small external inserter visible.

Before considering the use of reverse polarity DC in the present invention, it is appropriate to review the problems with conventional AC and DC powering schemes. Since CATV equipment provided to a subscriber's home is an environment in which wet contact is assumed to be likely to occur, the voltages provided are limited to 15 volts RMS open circuit, as provided in the United States National Electrical Code (NEC), Section 725.31, promulgated by the National Fire Protection Association, Batterymarch Park, Quincy, Massachusetts. This 15 volt RMS potential is measured at a nominal line voltage of 120 volts. If AC power is utilized, voltages as low as 103.5 volts can occur, which corresponds to 12.9 volts RMS on the secondary terminals of the step-down transformer. With a loop resistance of 8 ohms plus 2 ohms equivalent transformer resistance, and with optimum load resistance, only 4.2 watts can be provided to the load, assuming a 10 ohm load in series with an 8 ohm loop plus the resistance of the transformer. This assumes a linear, resistive load, which is not the case in practice, and further assumes no sheath current. Only 4.2 watts is considered insufficient for powering all of the circuitry in the off-premises equipment.

The United States National Electrical Code treats AC and DC differently on the ground that AC is known to have more effects on the human body. In particular, the risk of ventricular fibrillation is more of a problem when AC passes through the torso, than when DC passes. Ventricular fibrillation is the process of upsetting the heart's normal pulse as a result of electrical stimuli applied by passing current through the torso. Under extreme conditions, death can result by causing the heart to stop beating. Other effects of AC electrical shock include asphyxia, burns, and muscle spasm. Voltages as low as 12 volts at 25–60 Hz have been shown to be all that some individuals can withstand under conditions of good contact. In these tests, current ranges from 6–10 milliamps. Tests with DC indicated slightly higher current values can be withstood for a short time, until a hot spot occurs at the point of contact.

An alternative powering scheme of using direct current (DC) results in a voltage limitation of 30 volts. This allows provision of up to 22.5 watts. However, the DC electrical power must pass through at least four electromechanical connections in a typical off-premises signal control powering application—one at the power source, two at the ground block just outside the subscriber's premises, and one at the off-premises equipment. Each of these connections is typically made with the F-connector, commonly used in the CATV industry, which is known to be susceptible to corrosion in the presence of direct current, as described above. The result is the undesirable and annoying interruption of cable television service.

Accordingly, to avoid the shock hazard of AC and the corrosion difficulties of DC, the present invention provides reversing polarity DC at a frequency sufficiently low to avoid being classified as AC under applicable regulatory standards yet alternating sufficiently often to avoid corrosion complications of DC. Turning next to FIG. 4, the preferred power inserter circuit 200 comprises a power pack portion 202 and a polarity reversing power inserter portion 204 that are operative to generate a reversed polarity DC in accordance with the present invention. The power inserter circuit may be constructed as a single unit, or may be physically split into the power pack portion 202 and a separate polarity reversing power inserter portion 204.

In accordance with the invention, the power inserter circuit 200 generates a direct current (DC) voltage, but the polarity is reversed at a rate much lower than 60 Hz, the nominal AC line frequency in North America. Accordingly, the signal generated is not covered in the NEC §725. The closest case is that of interrupted direct current, interrupted at a rate of 10–200 Hz. It will be noted that the maximum voltage allowed where wet contact is likely to occur is 12.4 volts, as set forth in Note 5 for Table 725-31($a$) and ($b$) of the National Electrical Code. Under the assumption that the NEC treats DC chopped at less than a 10 Hz rate as a direct current, a maximum voltage of 30 volts DC would be permitted under these conditions.

In accordance with the invention, the shock potential of direct current chopped at an extremely low rate, less than 10 Hz, and at reversing polarity, is equivalent. The rationale for this assertion is that DC potential ±30 volts has equal shock potential. The present invention is operative to alternately place +30 volts and −30 volts on the drop 115. The frequency of reversal is low enough so that the shock potential is that of direct current, based on the NEC restrictions. Thus, the signal control apparatus 130 is powered with polarity reversing direct current, with a reversal occurring at a rate preferably not to exceed 10 Hz. The open circuit voltage at the source will not exceed 30 volts at a line voltage of 120 volts. In other words, the invention is operative to receive an input voltage from a primary AC power source and to provide onto the drop a positive polarity DC voltage at an output peak voltage of no more than about 30 volts DC at an input voltage of 120 VAC for a first period of time at least 6 times longer than a half cycle of 60 Hz. The invention is further operative to alternatingly provide a negative polarity DC voltage at an output peak voltage of no more than about 30 volts DC at an input voltage of 120 VAC for a second period of time substantially the same as the first period of time.

Figure 3:
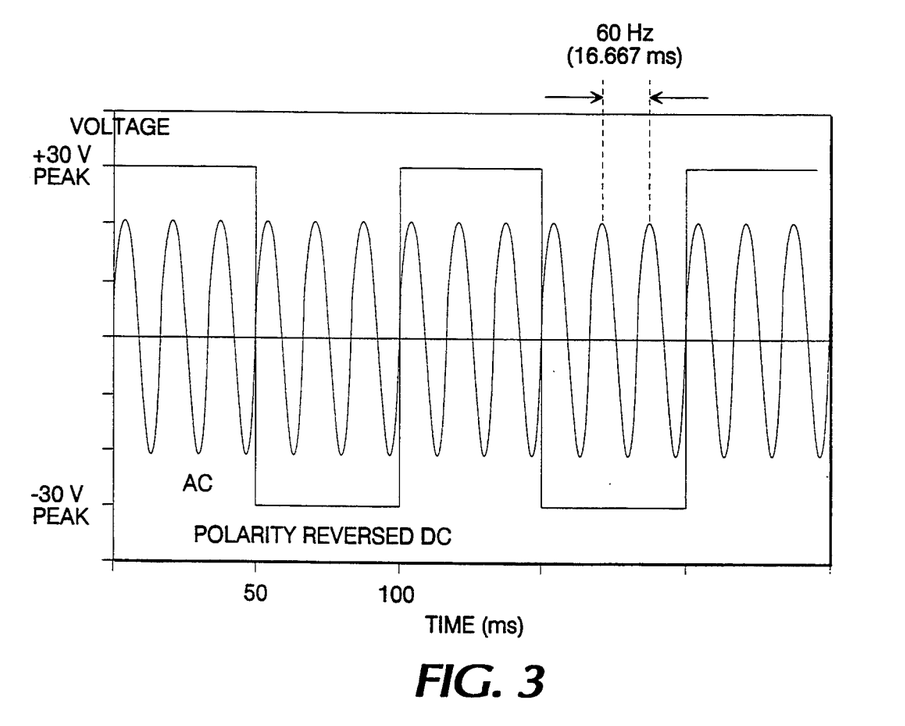
FIG. 3 is a voltage timing diagram illustrating the difference between alternating current (AC) and polarity reversed direct current (DC) provided in the preferred embodiment of the present invention.

FIG. 3 illustrates the difference between AC and polarity reversed DC. The relative amplitudes are correct—the 15 volt AC limit set forth in the NEC is an RMS value, related to the power and the wave form. Those skilled in the art will understand that 15 volts RMS AC is equivalent to 21.4 volts peak when the wave form is a sine wave, as in the case of power distribution. The RMS value of the polarity reversed DC is equal to its peak value of 30 volts. The RMS value of a wave form is the correct measure when deciding how much power can be transferred to the load. Note also that a full cycle of the maximum desirable frequency of reversal provided in the present invention (100 milliseconds, for 10 Hz) is at least 6 times greater than a cycle of 60 Hz (16.667 ms). Longer times for a full cycle of reversal may also be provided and are within contemplation of the present invention.

Referring again to FIG. 4, the power pack 202 comprises a transformer 210 that is operative to step down 120 VAC to about 23 volts AC. A full wave rectifier bridge 211 constructed in the known manner flips the negative-going excursions of the AC voltage to positive and negative potentials relative to a ground terminal 213. Filter capacitors 212, 214 operate to smooth the positive and negative potentials. Capacitors 212, 214 are preferably large, on the order of about 500 µF, sufficient to store and hold charge at above 31 volts when the polarity reversing circuit operates to connect the DC potential to the utilization circuit. The capacitor 212 is connected to the rectifier 211 to charge to a positive potential, and the capacitor 214 is connected to the rectifier to charge to a negative potential. The output of the power pack 202 is ±30 volts DC relative to the ground 213. These outputs are provided to the polarity reversing power inserter 204.

In the polarity reversing power inserter circuit 204, the ±30 volts are provided to PNP transistor 220 and NPN transistor 221, respectively, that switch the positive and negative polarity changes to the coaxial drop cable 115, which runs from the home to the signal control equipment located proximate to the distribution system. Transistors 220,221 are preferably standard type 2N4918 (PNP) and 2N4921 (NPN). The collectors of both transistors 220, 221 are commonly connected to node 224, to which the alternating DC voltage is applied. The voltage is supplied from node 224 through a radio frequency (RF) choke coil 223 of about 10 µH, which passes the low frequency power to the drop 115 but blocks the high frequency television information which is fed out from the drop via RF output on line 225. The television information is routed via line 225 by capacitor 228, which blocks the DC power from being passed to the TV signal apparatus.

The polarity reversing power inserter 204 further comprises a multivibrator circuit 230 having alternating outputs 231,232 connected to the bases of transistors 220 and 221. Multivibrator 230 alternately switches on the transistors 220, 221, but the two are never on together. The frequency of the multivibrator 230 is selected to determine the frequency at which the polarity of the DC is reversed. Preferably, a frequency below 10 Hz is selected. Preferred frequencies are between 1/60 and 10 Hz. Preferably, in order to ensure a 50% duty cycle, the multivibrator is triggered by a divide-by-two circuit such as a flip-flop. The multivibrator 230 employed in the preferred embodiment is a type 555 timer.

Figure 5:
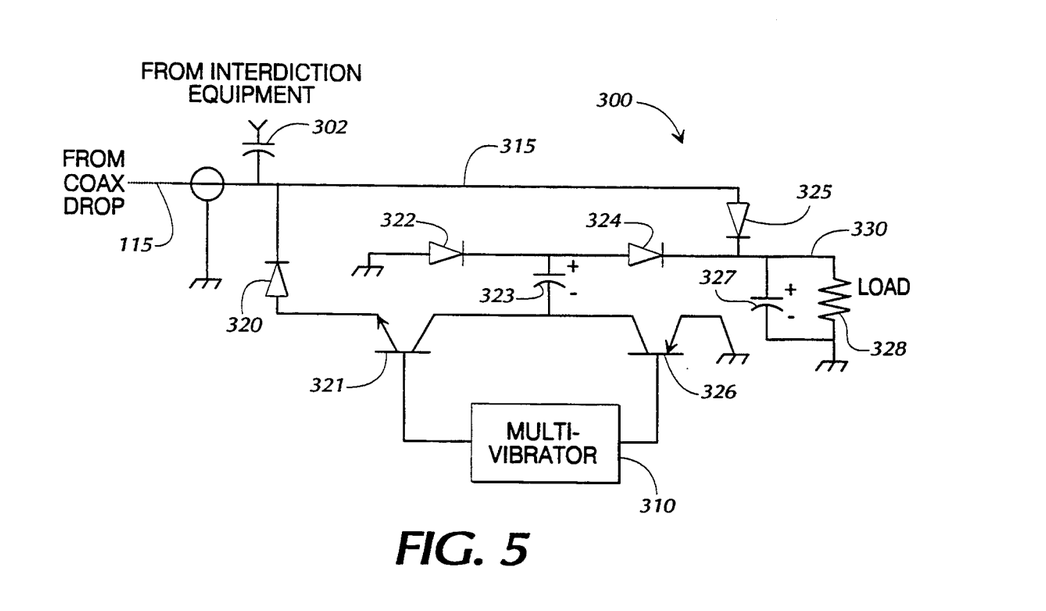
FIG. 5 illustrates a power utilization circuit provided in the off-premise signal control system for converting polarity-reversed DC provided by the power inserter circuit of FIG. 4 to conventional DC for utilization.

FIG. 5 illustrates a preferred power utilization circuit 300, which is preferably located proximate to the signal control device 130. The preferred power utilization circuit 300 receives the polarity reversing DC power and converts it to conventional DC for use by the power supply in the interdiction device 130. Power coming in from the coaxial drop cable 115 is blocked from the interdiction circuit 130 by a capacitor 302.

Signals from the interdiction device 130 at the higher modulated video carrier frequencies pass through the capacitor 302 and down the coax drop cable 115 in the known manner.

A multivibrator circuit 310 is connected to the bases of NPN transistor 321 and PNP transistor 326 and switches these transistors on and off to effect the conversion of reversing polarity DC provided from the drop cable 115 to positive DC on an output node 330. Multivibrator 310, also a type 555, operates at a much higher frequency than the multivibrator 230 in the power inserter circuit 200 and therefore switches transistors 321 and 326 on and off a rate much faster than that of the multivibrator in the power inserter circuit. At no time are both transistors 321 and 326 simultaneously on.

During the time that a positive voltage is applied via the drop 115, a diode 320 whose cathode is connected to the node 315 and whose cathode is connected to the emitter of the NPN transistor 321 is off. A second diode 325 whose anode is connected to the node 315 and whose cathode is connected to the node 330 is on during positive excursions. These diodes couple positive power directly to a filter capacitor 327 and the load 328. The load 328 may represent a switching power supply, which converts the power to a format more suitable for use by circuitry within the interdiction equipment 130. Typically, the switching power supply will provide +5 volts DC and ±12 volts DC, but it will be understood that other voltages may be generated and that the load 328 is represented only generally.

When the voltage appearing on the coax drop 115 and thus on line 315 is negative, diode 320 will be on and diode 325 will be off. When transistor 321 is on, current will be conducted through a third diode 322, capacitor 323, and transistor 321 to the node 315. This charges the capacitor 323 to a positive potential.

When NPN transistor 321 is off and PNP transistor 326 is on, capacitor 323 discharges through diode 324 and transistor 326, transferring charge to capacitor 327 such that the capacitor 327 is charged positively. In this manner, the polarity reversing DC transmitted on the drop 115 is converted into conventional DC, which appears across capacitor 327 and is applied to load 328.

It will thus be understood that the present invention is operative for powering apparatus located remotely from a primary power source (such as 117 VAC power in a subscriber facility) and connected through a conductor having a finite resistance (such as a coaxial cable), through use of direct current whose polarity changes at a rate significantly slower than that of normal 60 Hz alternating current. The rate of change is slow enough to avoid being considered AC or pulsed DC current by applicable regulatory bodies such as NEC. Preferably, the polarity reversing DC circuit is employed to obtain power from a subscriber's facility and transmit it to remotely located cable television equipment. In particular, the circuit constructed in accordance with the present invention is operative to power CATV subscriber signal control equipment such as interdiction equipment located remotely from a primary power supply and connected by a signal transmitting conductor having finite resistance.

Additionally, there has been disclosed the provision of a power inserter circuit comprising a power pack that is conveniently plugged into a 60 hertz 117 VAC outlet at a subscriber's facility, with a separate polarity reversing power inserter operative to transform about 23 volts AC provided by the power pack and insert polarity reversed DC at the extremely low frequencies described herein onto the drop cable so as to power the remotely located signal control apparatus, while still allowing transmission of television signals in the usual manner.

The preferred embodiment of the present invention has been disclosed by way of example, and it will be understood that other modifications may occur to those skilled in the art without departing from the scope and the spirit of the appended claims.

What is claimed is:

1. A system for powering a signal control apparatus located remotely from a primary AC power source and connected through a conductor having a finite resistance, comprising:
    means for connecting to a primary AC source of power;
    a step-down transformer for connecting to said primary AC power source and for providing AC power at a reduced voltage;
    a full wave rectifier for converting said reduced voltage AC power into a positive DC voltage and a negative DC voltage;
    a switching device for connecting said positive DC voltage and said negative DC voltage to a power buss;
    a constant duty cycle oscillator for alternately switching on said switching device at a predetermined frequency less than about 10 Hz, to provide a low frequency polarity reversing DC power; and
    means for inserting said low frequency polarity reversed DC power into said conductor.

2. The system of claim 1, further comprising:
    an RF choke for passing said low frequency polarity reversing DC power to said conductor.

3. The system of claim 1, wherein said primary AC source of power comprises 117 volts AC.

4. The system of claim 1, wherein said switching device comprise;
    a first switching transistor for connecting said positive DC voltage to said power buss; and
    a second switching transistor for connecting said negative DC voltage to said power buss.

5. The system of claim 1, wherein said inserting means comprises an RF choke operative to pass the DC component of said polarity reversed DC power into a cable television drop cable.

6. The system of claim 1, wherein said system is a source of power for a signal control apparatus in a cable television signal distribution system, wherein said conductor comprises a drop cable, wherein said primary AC source of power is located in a subscriber's facility, and wherein said signal control apparatus is an interdiction system.

7. The system of claim 1, wherein said connecting means, said step-down transformer, and said hill-wave rectifier comprise an AC power pack for connection to 117 volts AC and mounted in a first module; and
    wherein said switching device, said constant duty cycle oscillator, and said inserting means are mounted in a second module separate from said first module.

8. The system of claim 1, wherein said polarity reversed DC is less than ±30 volts.

9. In a cable television system comprising a distribution cable, a subscriber facility, a signal control apparatus located remotely from said subscriber facility and connected to said distribution cable, and a drop cable extending between said signal control apparatus and said subscriber facility, a power inserting system for supplying power to said signal control apparatus, comprising:
    a step-down transformer for connecting to a source of AC power and for providing AC power at a reduced voltage;
    a full wave rectifier for converting said reduced voltage AC power into a positive DC voltage and a negative DC voltage;
    a first switching transistor for connecting said positive DC voltage to a power buss;
    a second switching transistor for connecting said negative DC voltage to said power buss;
    a constant duty cycle oscillator for alternately switching on said first transistor and said second transistor at a predetermined frequency less than 10 Hz, to provide a low frequency polarity reversing DC power; and
    an RF choke for passing said polarity reversing DC power to said drop cable.

10. The power supplying system of claim 9, further comprising a power utilization circuit associated with said signal control apparatus, said power utilization circuit comprising:
    means for connecting to said drop cable;
    means for connecting signals from said signal control apparatus to said drop cable;
    means for converting said low frequency polarity reversing DC power to single polarity DC power; and
    means for connecting said single polarity DC power to power consuming devices in said signal control apparatus.

11. The power supplying system of claim 10, wherein said means for connecting said single polarity DC power to power consuming devices comprises a switching power supply.

12. The power supplying system of claim 10, wherein said converting means comprises:
    a first switching transistor;
    a first diode having an anode connected to said first switching transistor;
    a second diode having a cathode connected to a power output buss;
    a second switching transistor having a terminal connected to ground;
    a filter capacitor connected to said power output buss;
    a third diode having an anode connected to ground and a cathode connected to said filter capacitor;
    a fourth diode having an anode connected to said filter capacitor and a cathode connected to said power output buss; and
    an oscillator circuit for alternately switching on said first transistor and said second transistor at a frequency substantially higher than the frequency of said low frequency polarity reversing DC power, whereby the negative excursion of said polarity reversing DC power is converted to a positive excursion at said power buss.

13. In a cable television system comprising a distribution cable, a subscriber facility, a signal control apparatus located remotely from said subscriber facility and connected to said distribution cable, and a drop cable extending between said signal control apparatus and said subscriber facility, a system for supplying power to said signal control apparatus, comprising:
- a polarity reversing DC power inserter circuit located at said subscriber facility, comprising:
  - means for connecting to a source of AC power and for providing AC power at a reduced voltage;
  - means for converting said reduced voltage AC power into a positive DC voltage and a negative DC voltage;
  - a first switch for connecting said positive DC voltage to a power buss;
  - a second switch for connecting said negative DC voltage to said power buss;
  - means for alternately switching on said first switch and said second switch at a predetermined frequency less than the frequency of said AC power, to provide a low frequency polarity reversing DC power; and
  - means for inserting said polarity reversing DC power to said drop cable; and
- a power utilization circuit located proximate said signal control apparatus for convening said polarity reversing DC power from said drop cable to single polarity DC power for use by said signal control apparatus.

14. The power supplying system of claim 13, wherein said power utilization circuit comprises:
- a first switch;
- a first diode having an anode connected to a terminal of said first switch;
- a second diode having a cathode connected to a power output buss;
- a second switch having a terminal connected to ground;
- a filter capacitor connected to said power output buss;
- a third diode having an anode connected to ground and a cathode connected to said filter capacitor;
- a fourth diode having an anode connected to said filter capacitor and a cathode connected to said power output buss; and
- means for alternately switching on said first switch and said second switch at a frequency substantially higher than the frequency of said polarity reversing DC power,
- whereby the negative excursion of said polarity reversing DC power is converted to a positive excursion at said power buss.

15. The power supplying system of claim 13, wherein said connecting means and said converting means comprises a step-down transformer and a full wave rectifier.

16. The power supplying system of claim 13, wherein said first switch and said second switch comprise transistor switches.

17. The power supplying system of claim 13, wherein said alternately switching means comprises a 50% duty cycle multivibrator circuit.

18. Apparatus for powering electrical equipment located remotely from a primary 60 Hz AC power source and connected through a conductor, comprising:
- a circuit connected to receive an input voltage from said primary AC power source for providing onto said conductor a positive polarity DC voltage at an output peak voltage of no more than about 30 volts DC at an input voltage of 120 VAC for a first period of time at least 6 times longer than a half cycle of 60 Hz,
- said circuit being further operative to alternatingly provide a negative polarity DC voltage at an output peak voltage of no more than about 30 volts DC at an input voltage of 120 VAC for a second period of time substantially the same as said first period of time,
- thereby providing a polarity reversing DC power source.

19. The apparatus of claim 18, further comprising a circuit located at said electrical equipment for converting said positive polarity DC voltage and said negative polarity DC voltage to a positive DC voltage for utilization by said electrical equipment.

20. The apparatus of claim 18, wherein said circuit comprises:
- input terminals for connecting to said primary 60 Hz AC power source;
- a circuit for converting said input voltage to a predetermined DC voltage;
- a circuit for periodically reversing the polarity of said predetermined DC voltage at a rate corresponding to said first period of time to obtain said positive polarity DC voltage and said negative polarity DC voltage; and
- output terminals for inserting said positive polarity DC voltage and said negative polarity DC voltage into said conductor.

21. The apparatus of claim 20, wherein said converting circuit comprises:
- a step-down transformer for connecting to said primary 60 Hz AC power source and for providing a reduced AC voltage, and
- a full wave rectifier for converting said reduced AC voltage into said predetermined DC voltage.

22. The apparatus of claim 20, wherein said input terminals and said converting circuit comprise an AC power pack for connection to 117 volts AC and mounted in a first module; and
- wherein said reversing circuit and said output terminals are mounted in a second module separate from said first module.

23. The apparatus of claim 20, wherein said reversing circuit comprises:
- a first capacitor for charging to a positive polarity;
- a second capacitor for charging to a negative polarity;
- a first switching transistor for connecting said first capacitor to a power buss;
- a second switching transistor for connecting said second capacitor to said power buss;
- a constant duty cycle oscillator for alternately switching on said first transistor and said second transistor at a predetermined frequency less than 10 Hz, to provide a low frequency polarity reversing DC power; and
- an RF choke for passing said positive polarity DC voltage and said negative polarity DC voltage to said conductor.

24. The apparatus of claim 18, further comprising an RF choke operative to pass the DC component of said positive polarity DC voltage and said negative polarity DC voltage into a cable television drop cable.

25. The apparatus of claim 18, wherein said apparatus is a source of power for a signal control apparatus in a cable television signal distribution system, wherein said conductor comprises a drop cable, and wherein said primary 60 Hz AC power source is located in a subscriber's facility.

26. The apparatus of claim 25, wherein said signal control apparatus is an interdiction system.

27. A system for powering a signal control apparatus located remotely tom a primary AC power source and connected through a conductor having a finite resistance, comprising:
   means for connecting to a primary AC source of power;
   a step-down transformer for connecting to said primary AC power source, and for providing AC power at a reduced voltage;
   a full wave rectifier for converting said reduced voltage AC power into a positive DC voltage and a negative DC voltage;
   a switching device for connecting said positive DC voltage and said negative DC voltage to a power buss;
   a constant duty cycle oscillator for alternately switching on said switching device at a predetermined frequency less than about 10 Hz, to provide a low frequency polarity reversing DC power; and
   means for inserting said low frequency polarity reversed DC power into said conductor,
   said connecting means, said step-down transformer, and said full-wave rectifier comprising an AC power pack mounted in a first module,
   said switching device, said constant duty cycle oscillator, and said inserting means being mounted in a second module separate from said first module.

28. In a cable television system comprising a distribution cable, a subscriber facility, a signal control apparatus located remotely from said subscriber facility and connected to said distribution cable, and a drop cable extending between said signal control apparatus and said subscriber facility, a system for supplying power to said signal control apparatus comprising:
   (a) a polarity reversing DC power inserter circuit located at said subscriber facility, comprising:
      means for connecting to a source of AC power and for providing AC power at a reduced voltage;
      means for converting said reduced voltage AC power into a positive DC voltage and a negative DC voltage;
      a first switch for connecting said positive DC voltage to a power buss;
      means for alternately switching on said first switch and said second switch at a predetermined frequency less than the frequency of said AC power, to provide a low frequency polarity reversing DC power; and
      means for inserting said polarity reversing DC power to said drop cable; and
   (b) a power utilization circuit located proximate said signal control apparatus for converting said polarity reversing DC power from said drop cable to single polarity DC power for use by said signal control apparatus, comprising:
      a first switch:
      a first diode having an anode connected to a terminal of said first switch;
      a second diode having a cathode connected to a power output buss;
      a second switch having a terminal connected to ground;
      a filter capacitor connected to said power output buss;
      a third diode having an anode connected to ground and a cathode connected to said filter capacitor;
      a fourth diode having an anode connected to said filter capacitor and a cathode connected to said power output buss; and
      means for alternately switching on said first switch and said second switch at a frequency substantially higher than the frequency of said polarity reversing DC power, whereby the negative excursion of said polarity reversing DC power is converted to a positive excursion at said power buss.

29. Apparatus for powering electrical equipment located remotely from a primary 60 Hz AC power source and connected through a conductor, comprising:
   a circuit connected to receive an input voltage from said primary AC power source for providing onto said conductor a positive polarity DC voltage at an output peak voltage of no more than about 30 volts DC at tin input voltage of 120 VAC for a first period of time at least 6 times longer than a half cycle of 60 Hz,
   said circuit being further operative to alternately provide a negative polarity DC voltage at an output peak voltage of no more than about 30 volts DC at an input voltage of 120 VAC for a second period of time substantially the same as said first period of time,
   said circuit comprising:
      input terminals for connecting to said primary AC power source;
      a circuit for converting said input voltage to a predetermined DC voltage;
      a circuit for periodically reversing the polarity of said predetermined DC voltage at a rate corresponding to said first period of time to obtain said positive polarity DC voltage and said negative polarity DC voltage; and
      output terminals for inserting said positive polarity DC voltage and said negative polarity DC voltage into said conductor,
      said input terminals and said converting circuit comprising an AC power pack mounted in a first module,
      said reversing circuit and said output terminals being mounted in a second module separate from said first module.

* * * * *